United States Patent
Franklin

(10) Patent No.: US 12,058,990 B2
(45) Date of Patent: Aug. 13, 2024

(54) SMART REEL ASSEMBLY

(71) Applicant: R&D OUTDOORS, LLC, Bloomville, OH (US)

(72) Inventor: Rick Franklin, Bloomville, OH (US)

(73) Assignee: R&D OUTDOORS, LLC, Bloomville, OH (US)

(*) Notice: Subject to any disclaimer, the term of this patent is extended or adjusted under 35 U.S.C. 154(b) by 178 days.

(21) Appl. No.: 17/824,285

(22) Filed: May 25, 2022

(65) Prior Publication Data
US 2022/0378029 A1    Dec. 1, 2022

Related U.S. Application Data

(60) Provisional application No. 63/192,726, filed on May 25, 2021.

(51) Int. Cl.
| | | |
|---|---|---|
| *A01K 89/01* | (2006.01) | |
| *A01K 89/015* | (2006.01) | |
| *A01K 91/20* | (2006.01) | |

(52) U.S. Cl.
CPC .......... *A01K 91/20* (2013.01); *A01K 89/0178* (2015.05); *A01K 89/0182* (2015.05); *A01K 89/01928* (2015.05)

(58) Field of Classification Search
CPC .......... A01K 89/0102; A01K 89/01026; A01K 89/0126; A01K 89/0155; A01K 89/0178; A01K 89/0182; A01K 91/02; A01K 91/20
See application file for complete search history.

(56) References Cited

U.S. PATENT DOCUMENTS

| | | | |
|---|---|---|---|
| 2,668,025 A | | 2/1954 | Hull |
| 3,836,092 A | | 9/1974 | Hull |
| 5,232,223 A | * | 8/1993 | Dornbusch ........... A63F 13/428 |
| | | | 463/37 |
| 5,941,528 A | | 8/1999 | Boivin, Jr. |
| 8,336,249 B2 | | 12/2012 | Newton |
| 9,968,078 B2 | | 5/2018 | Worley, III |
| 10,223,937 B2 | | 3/2019 | Pacchione |
| 11,229,194 B2 | * | 1/2022 | Perkins ................ A01K 87/007 |
| 2008/0134563 A1 | | 6/2008 | Gunter |
| 2011/0259988 A1 | | 10/2011 | Strohecker et al. |
| 2011/0283594 A1 | | 11/2011 | Boy |
| 2012/0058456 A1 | | 3/2012 | Drinkard |

(Continued)

FOREIGN PATENT DOCUMENTS

| | | |
|---|---|---|
| CA | 2567159 A1 | 5/2007 |
| CN | 211960635 U | 11/2020 |

(Continued)

OTHER PUBLICATIONS

Written Opinion of the International Searching Authority dated Oct. 7, 2022.

*Primary Examiner* — Emmanuel M Marcelo
(74) *Attorney, Agent, or Firm* — Jacob M. Ward; Ward Law Office LLC

(57) ABSTRACT

A casting device may include a microcontroller, an inertial measurement unit in communication with the microcontroller, an actuator in communication with the microcontroller, and a power source for providing power to the casting device. The casting device may also include one or more indicators that provide user feedback regarding accurate use of the device.

18 Claims, 13 Drawing Sheets

(56) References Cited

U.S. PATENT DOCUMENTS

| | | |
|---|---|---|
| 2015/0327526 A1 | 11/2015 | Cooper |
| 2020/0008410 A1* | 1/2020 | Perkins .................. G01P 13/00 |
| 2021/0298284 A1* | 9/2021 | Yasuda ................ A01K 89/033 |

FOREIGN PATENT DOCUMENTS

| | | | | |
|---|---|---|---|---|
| JP | 2000225269 A | * | 8/2000 | |
| JP | 2017216938 A | * | 12/2017 | |
| JP | 2017216938 A | | 12/2017 | |
| KR | 20200136112 A | * | 12/2020 | |
| WO | WO-0124898 A1 | * | 4/2001 | ............. A63F 13/06 |

* cited by examiner

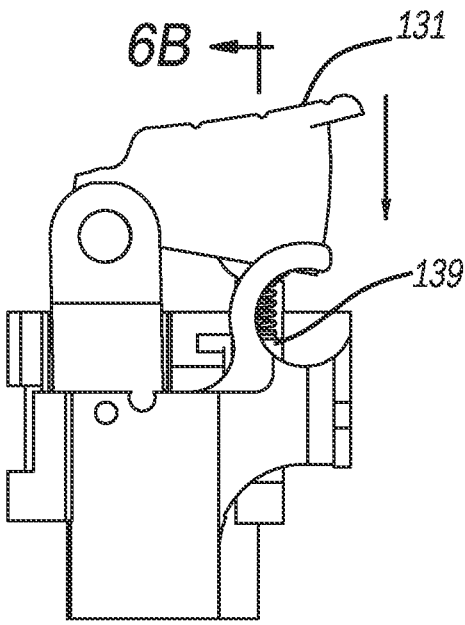
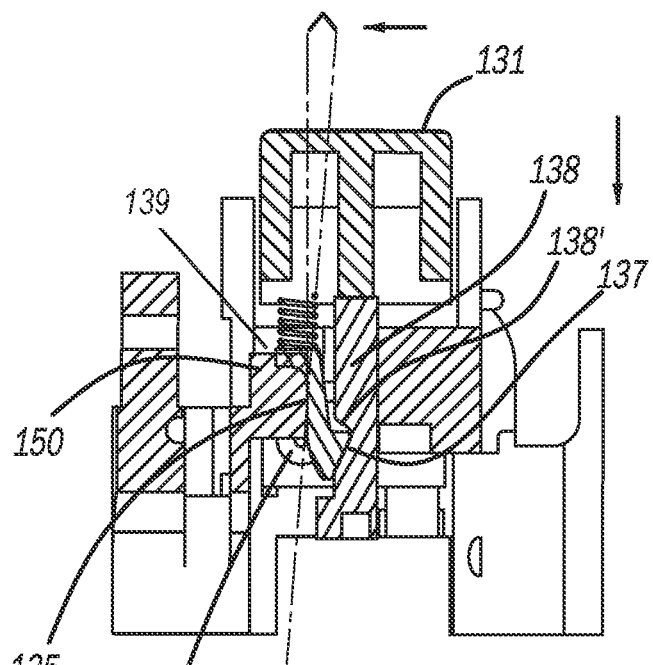
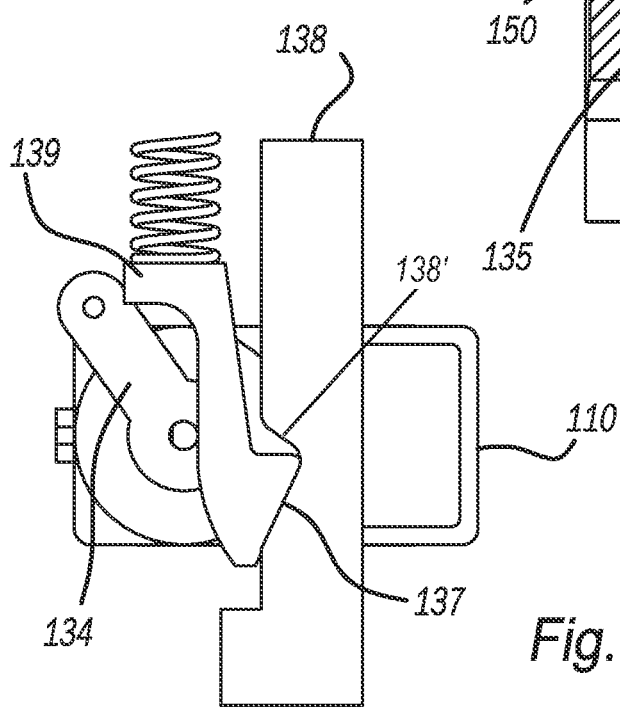
Fig. 6A
Fig. 6B
Fig. 6C

SMART REEL ASSEMBLY

CROSS-REFERENCE TO RELATED APPLICATIONS

This application claims the benefit of U.S. Provisional Application No. 63/192,726, filed on May 25, 2021. The entire disclosure of the above application is incorporated herein by reference.

FIELD

The present technology relates to fishing reels. More specifically, the present technology relates to a device to teach proper casting of a fishing reel.

INTRODUCTION

This section provides background information related to the present disclosure which is not necessarily prior art.

Traditionally, a fishing rig may include a fishing rod and of a fishing reel with the fishing line. The fishing line may be unreeled during casting to project the line to a certain distance into a fishing area and reeled in through an operation of a crank to retrieve the line and/or a caught fish. Spinning reels may include a pickup which, in a first unlatched position, allows the fishing line wound around a fixed spool in the reel to unreel and, in a second latched position, allows the line to be reeled in around the fixed spool through the operation of the crank. With a spinning reel, the fisherman may hold the fishing line with a finger or a reel cast button, open a pick-up, and proceed to cast the line by moving the rod forward, during which step the fisherman must release the fishing line held with the finger or the reel cast button to allow the line to be projected forward.

A fisherman, however, may have problems synchronizing the casting motion and the instant at which the fisherman needs to release the line to allow it to be properly projected. This synchronization may be more awkward when the fisherman is a beginner or when the fisherman has a disability. There are variety of disclosures and publications for devices to how to properly cast. These devices may include practice equipment, which may generally include a rod and some form of casting line, a combination of sensors that attempt to gauge the location of the reel during casting, spring-loaded mechanisms to release the line during a cast once the mechanism has sufficient force applied thereto, and other similar devices. However, these casting devices fail to teach a system that combines the use of sensors and an automatic casting mechanism in a functional reel, which may be adjusted based on a skill level of a user.

Accordingly, there is a need to provide a device that teaches a user correct casting techniques with the ability to adjust a control of the casting device based on a level of experience of a user.

SUMMARY

In concordance with the instant disclosure, a casting device that teaches a user correct casting techniques with the ability to adjust a control of the casting device based on a level of experience of a user, has surprisingly been discovered.

The present technology includes articles of manufacture, systems, and processes that relate to a casting device for teaching proper casting technique. The casting device may include a microcontroller that is in communication with an inertial measurement unit (IMU). The microcontroller may also control an actuator that in turn may rotate an arm between a first position and a second position. The arm, in the second position, may prevent the casting mechanism of a fishing reel from casting line. The casting device may also include one or more indicators that may provide user feedback regarding accurate use of the casting device.

In certain embodiments, a casting device includes a microcontroller, an IMU in communication with the microcontroller, and a power source for providing power to the casting device. The IMU may be configured to monitor a position of the casting device relative to an axis of motion and may be configured to send a signal to the microcontroller based on the position of the casting device relative to the axis of motion. The microcontroller may be configured to send a signal to one or both of an actuator and an indicator based on a signal from the IMU. The power source may be a battery. In certain embodiments, the battery is a solar powered battery.

The indicator may be configured to generate a first alert when the casting device moves to a first predetermined position relative to the axis of motion as determined by the inertial measurement unit and generate a second alert when the casting device moves to a second position relative to the axis of motion as determined by the inertial measurement unit. The first position may comprise a predetermined back cast position and the second position may comprise a predetermined forward cast position. In certain embodiments, the first position and the second position are adjustable. The indicator may be configured to generate one of an auditory alert, a visual alert, and a haptic alert.

In certain embodiments, the IMU may be configured to measure an acceleration of the casting device. For example, the indicator may generate an alert if the casting device is accelerating one of above a predetermined threshold and below a predetermined threshold. The actuator may be configured to move the casting device between a locked position and an unlocked position, where line may be released from the casting device when the casting device is in the unlock position. In certain embodiments, the actuator may be configured to move the casting device to the unlocked position when the casting device moves to a predetermined forward cast position. In certain embodiments, the indicator may be configured to generate an alert when the casting device moves to the predetermined back cast position. The casting device may also include a reel cast button for manually releasing line from the casting device.

In certain embodiments, a method of using a casting device may include the steps of selecting one of a manual mode, a guided mode, and an automatic mode, moving the casting device to a start position to activate the casting device, and moving the casting device in a casting arc to release a line from the casting device. In certain embodiments, the casting arc may be initiated by depressing a reel cast button of the casting device. A position of the casting device may be monitored throughout the casting arc and one or more alerts may be generated based on a position of the casting device within the casting arc. A first alert may be generated at a predetermined back cast position of the casting arc and a second alert may be generated at a predetermined forward cast position of the casting arc. The casting device may be unlocked at a forward cast position to release the line from the casting device.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6A is a left side elevational view of the casting device illustrating the casting device with the reel cast button depressed and certain components of the casting device are engaged;

FIG. 6B is a rear cross-sectional view taken at line E-E in FIG. 6A illustrating the casting device with the reel cast button depressed and certain components of the casting device are engaged;

FIG. 6C is a rear elevational view illustrating the casting device with the with the reel cast button depressed and certain components of the casting device are engaged;

DETAILED DESCRIPTION

Figure 1:
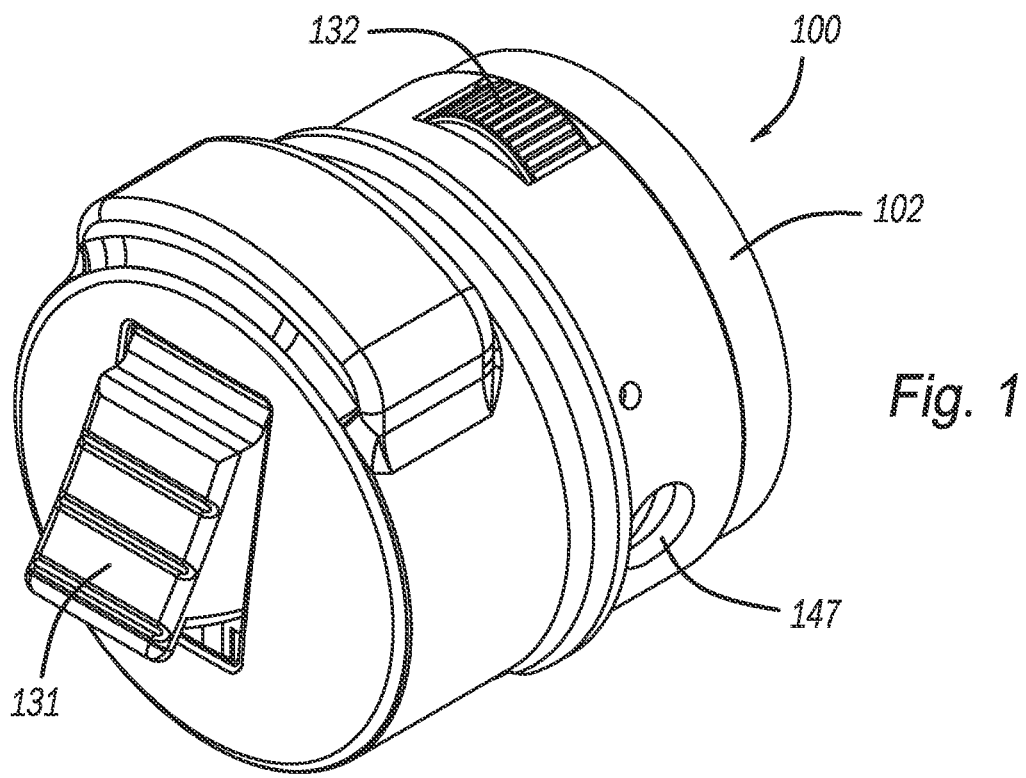
FIG. 1 is a top perspective view of an assembled fishing reel, in accordance with the present technology.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms.

These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology relates to a casting device that enables an individual to learn how to cast. The casting device may be configured as part of a spincasting fishing reel that is mounted on a fishing rod. Various embodiments include where the casting device may be integrated into a pre-existing spincasting fishing reel. In this way, the casting device may be used to retrofit a pre-existing spincasting fishing reel, provided already integrated into the spincasting fishing reel, or be provided separately from the spincasting fishing reel. For example, the casting device can be configured to fit within a housing of a commercially available spincasting fishing reel.

The casting device allows a user to adjust the training level of the casting device, such that the user may gain additional control over the casting device as the user improves technique. The casting device includes a microcontroller and an inertial measurement unit (IMU). The IMU may be configured to monitor a position of the casting device relative to an axis of motion of the casting device. For example, the IMU may monitor the casting device during a casting arc including a back cast and/or a forward cast of the casting device. The IMU may be configured to send a signal to the microcontroller based on a position of the casting device within the casting arc. In certain embodiments, the microcontroller is configured to send a signal to one of an actuator and an indicator based on the signal from the IMU. A power source may provide power to the casting device. In certain embodiments, the power source is a battery. The battery may be a solar powered battery.

In certain embodiments, the microcontroller is configured to send a signal to the indicator to generate a first alert when the casting device moves to a first predetermined position relative to the axis of motion as determined by the IMU. The indicator may also generate a second alert when the casting device moves to a second position, different than the first position, as determined by the IMU. For example, the indicator may be configured to generate a first alert when the casting device moves to a predetermined back cast position and generate a second alert when the casting device moves to a predetermined forward cast position. In this manner, the first alert may indicate that an ideal back cast position has been reached and a user should begin a forward cast. Similarly, the second alert may indicate that an ideal forward cast position has been reached and the user should take an action, such as releasing a reel cast button or otherwise allowing line to be released from the casting device. In certain embodiments, the first position and the second position may be pre-programmed. Alternatively, the first position and the second position may be selectable by a user. The indicator may be configured to generate one of an auditory alert, a visual alert, a haptic alert, and combinations thereof. In certain embodiments, the IMU may be further configured to measure an acceleration of the casting device. For example, the IMU may be configured to send a signal to the microcontroller that the casting device is accelerating at a rate above and/or below a predetermined threshold. In response, the microcontroller may be configured to send a signal to the indicator which may generate an alert based on the acceleration of the casting device.

An actuator of the casting device may be configured to move an arm between a first position and a second position, such that line may be released from the casting device when the casting device is in the first position. For example, the actuator may move the casting device to the first position when the casting device has moved to the predetermined forward cast position to release line from the casting device. In certain embodiments, the indicator is configured to generate a first alert to indicate to a user that a predetermined back cast position has been reached and the user should begin a forward. The actuator may move the casting device to the unlocked position when the casting device has moved to the predetermined forward cast position to release line from the casting device. In certain embodiments the casting device includes a reel cast button for manually releasing line from the casting device.

As described herein, the casting device may be the same size and shape as a traditional casting reel. Further, the casting device may be mounted on various types of rods for use in fishing. The casting device may be mounted on a rod using one or more appropriately desired attachment devices known to those of skill in the art.

The casting device may integrated into a fishing reel, including a reel housing or case, which may include, a spool, drag adjustment knob, one or more gears, and a reel cast button and other appropriately desired casting components. Additionally, other mechanisms may also be included in the casting mechanism to enable the casting device to function properly as a spincasting reel without departing from the spirit of the present disclosure. The casting device may be encompassed within a reel casing within the spincasting reel body.

EXAMPLES

Example embodiments of the present technology are provided with reference to the several figures enclosed herewith.

Figure 2:
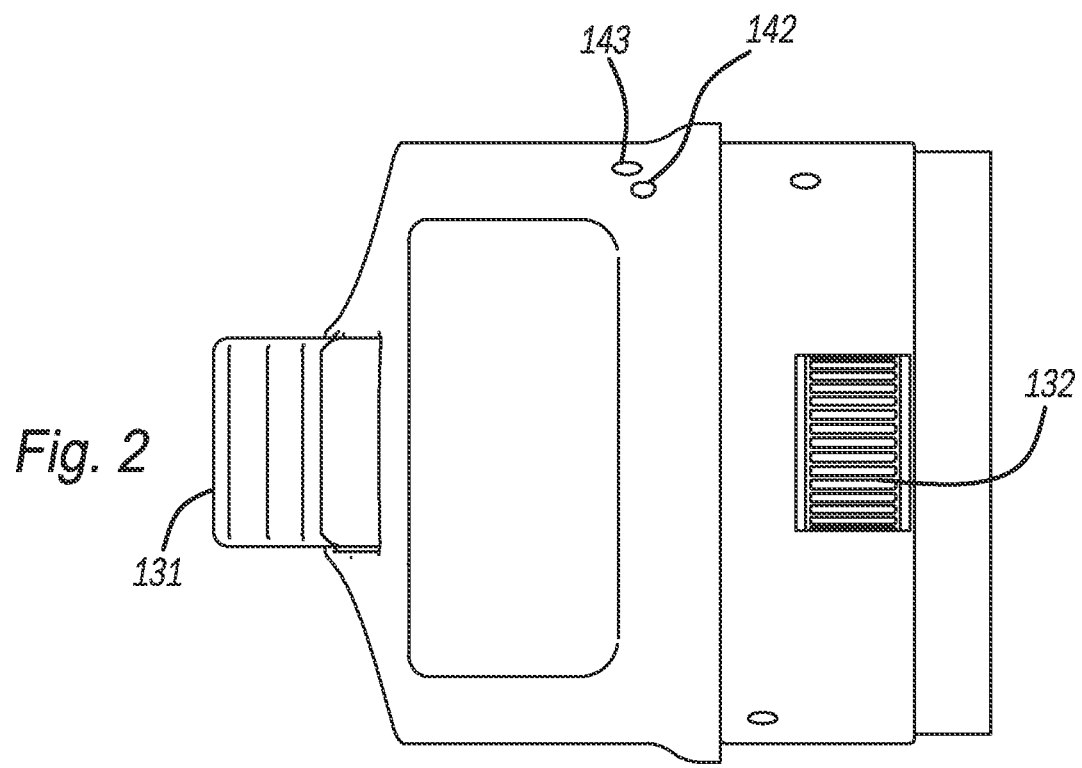
FIG. 2 is a top plan view of the assembled fishing reel.
Figure 3:
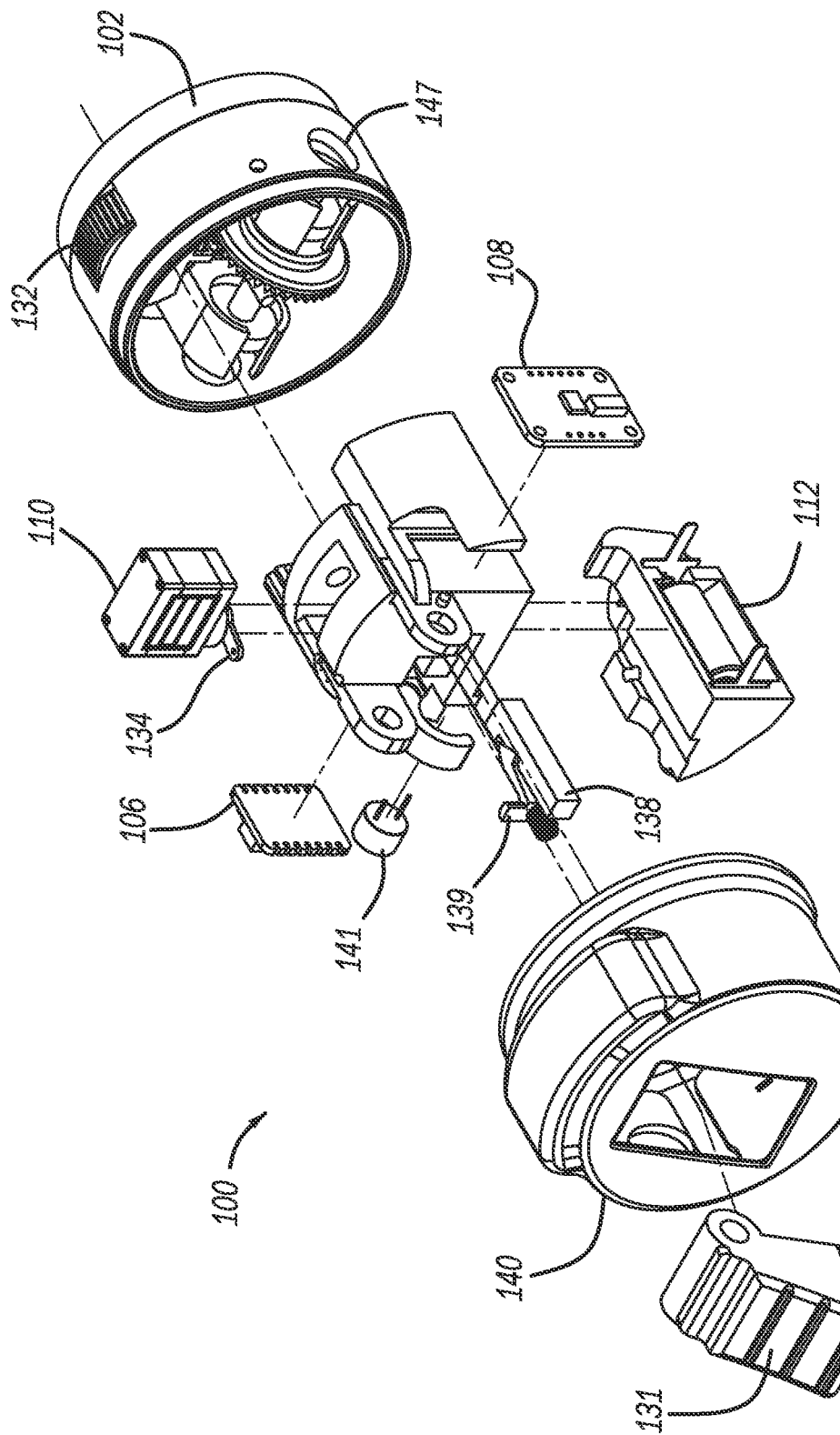
FIG. 3 is a partially exploded view of the fishing reel showing an internal casting device and components thereof.
Figure 4:
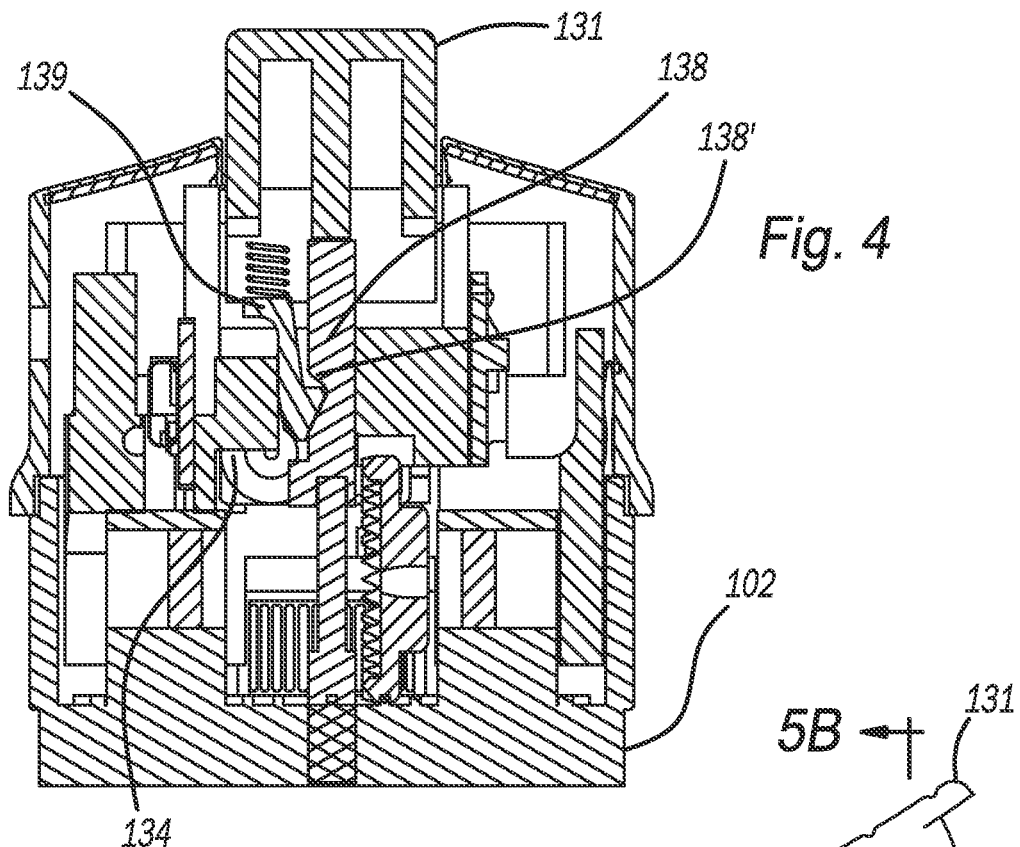
FIG. 4 is a cross-section view of the fishing reel and the casting device.

FIGS. 1-6C show a spincasting reel enclosing a casting device 100 constructed in accordance with the present technology. FIGS. 1 and 2 depict an assembled fishing reel housing an internal casting device 100, where internal integration of the casting device 100 is shown in FIGS. 3-7C. The assembled fishing reel may include a top casing 140 containing one or more components of the casting device 100, a reel cast button 131 for manually operating the casting device 100, a drag adjustment 132, and other appropriately desired components, such as a reel handle insert 147 for inserting an appropriately desired reel handle that may be attached to the drive gears. As would be understood by someone of ordinary skill in the art, any appropriately desired of handle may be attached to the casting device 100 for operating the drive gears.

The casting device 100 may also include a microcontroller 106, an IMU 108, an actuator 110, and a power source 112, all of which may be housed within the casting device 100. These components, as well as various resistors, capacitors, wires, linkages, buzzers, LEDs, and push buttons that are incorporated within the casting device 100 may be assembled and located inside and/or on the reel casing 102. The reel casing 102 may comprise a reel casing 102, such as for example, a Zebco® reel casing 102. The casting device 100 can be designed to fit internally within various known spincasting reels and used with various known fishing rods. Examples of known spincasting reels include those from Zebco (Tulsa, OK) known as the 303 spincasting reel, the 33 spincasting reel, and the OMEGA spincasting reel, among others. Further examples of spincasting reels that can be adapted to house the casting device 100 include spincasting reels described by U.S. Pat. Nos. 2,668,025 and 3,836,092, both to R. Hull, the disclosures of which are incorporated herein by reference.

The microcontroller 106 is in communication with the IMU 108. The IMU 108 is configured to monitor a position of the casting device 100, relative to at least one axis of motion during use of the casting device 100. Additionally, the IMU 108 may monitor an acceleration of the casting device 100 while moving within the axis of motion. During operation of the casting device 100, the casting device 100 may be pivoted by the user and moved in an arc shaped path. The IMU 108 may both detect the position of the casting device 100 relative to the arc shaped path as well as detect the amount of acceleration the casting device 100 has within the arc shaped path. In particular, the IMU 108 may monitor an operation of the casting device 100 as it moves between an initial starting position, a back cast position, and a forward cast position. The IMU 108 may be programmed to respond to communication requests from the microcontroller 106 and may provide positional and acceleration updates at predetermined intervals. Alternatively, or in conjunction, the IMU 108 may provide positional and acceleration updates when a predetermined position or a predetermined acceleration is attained. For example, the IMU 108 may provide a positional update when the casting device 100 moves to one or both of a predetermined back cast position and a predetermined forward cast position.

The microcontroller 106 is configured to monitor the information communicated from the IMU 108 and may send a signal to one or both of an indicator 120 to generate an alert to a user 201 and an actuator 110 to move the casting device to a locked position or an unlocked position when a predetermined condition has been detected. For example, when a predetermined condition is detected, the microcontroller 106 is configured to send a signal to the actuator 110 and the indicator 120 to perform an operation. The indicator 120 may be any device or mechanism that may provide an alert to the user. For example, the indicator 120 may provide one of a visual signal, an auditory signal, and a haptic or vibration signal or combinations thereof to the user. The indicator 120 may include one or more of a buzzer 141 configured to generate a haptic or an auditory alert and a multi-colored LED source 143 for generating a visual alert. In certain embodiments, a reset button 142 may be configured for resetting the casting device 100.

The power source 112 may include a source of electrical power capable of providing sufficient power to control the casting device 100. For example, the power source 112 may be a battery, which is sized sufficiently to enable the electronic components to function in a desired capacity. In certain embodiments, the power source 112 may comprise a solar power source.

The actuator 110 may include a mechanism capable of moving the casting device 100 between an unlocked position and a locked position. For example, the actuator 110 may include an arm 134 for moving the casting device between a first unlocked position and a second locked position. In particular, the actuator 110 may be sized to fit within the reel casing 102 and be configured to engage a clutch disc or any other appropriately desired mechanism to allow and/or prevent line from releasing from the casting device 100 in the first position and the second position, respectively. In certain embodiments, the actuator 110 may include a servomotor. However, the actuator 110 may include any appropriately desired mechanism to move the casting device 100 between an unlocked and a locked position. For example, the actuator may include one of a servomotor, a stepper motor, and a brushless motor.

The actuator 110 may be a device that locks and unlock the casting device 100 within the reel casing 102 to release line from the casting device 100. The actuator 110 may be formed in an appropriate shape and/or configuration to lock and/unlock the casting device 100 in the within the reel casing 102 and enables line to be released from the casting device 100. In certain embodiments, the actuator 110 may selectively turn an arm 134 between a first position and a second position to selectively unlock and lock the casting device.

FIG. 4 and FIGS. 5A-5C show the actuator 110 and the arm 134 in the first position, in which the reel cast button 131 may be selectively depressed to move a center pin 138 in a downward direction toward to the reel casing 102 to lock the casting device 100 and prevent line from being dispensed from the casting device 100. In the first position, the when the reel cast button 131 is released, the center pin 138 may be released such that line may be dispensed from the casting device 100.

Figure 5A:
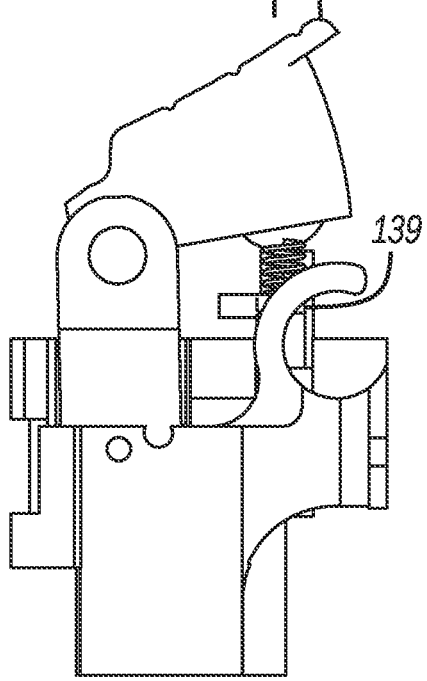
FIG. 5A is a left side elevational view of the casting device at rest where certain components of the casting device are not engaged.
Figure 5B:
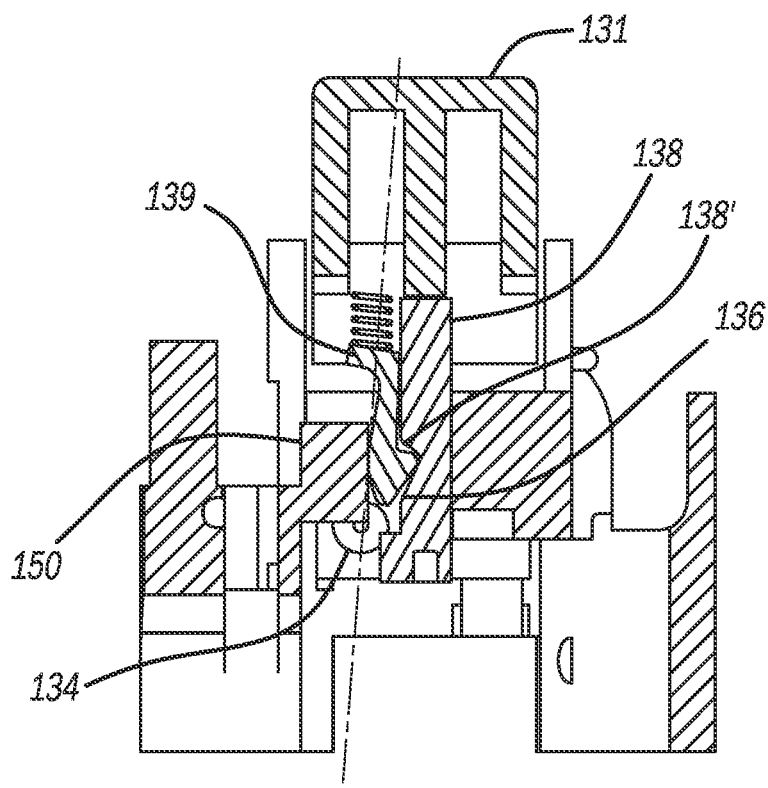
FIG. 5B is a rear cross-sectional view taken at line D-D in FIG. 5A illustrating the casting device at rest where certain components of the casting device are not engaged.
Figure 5C:
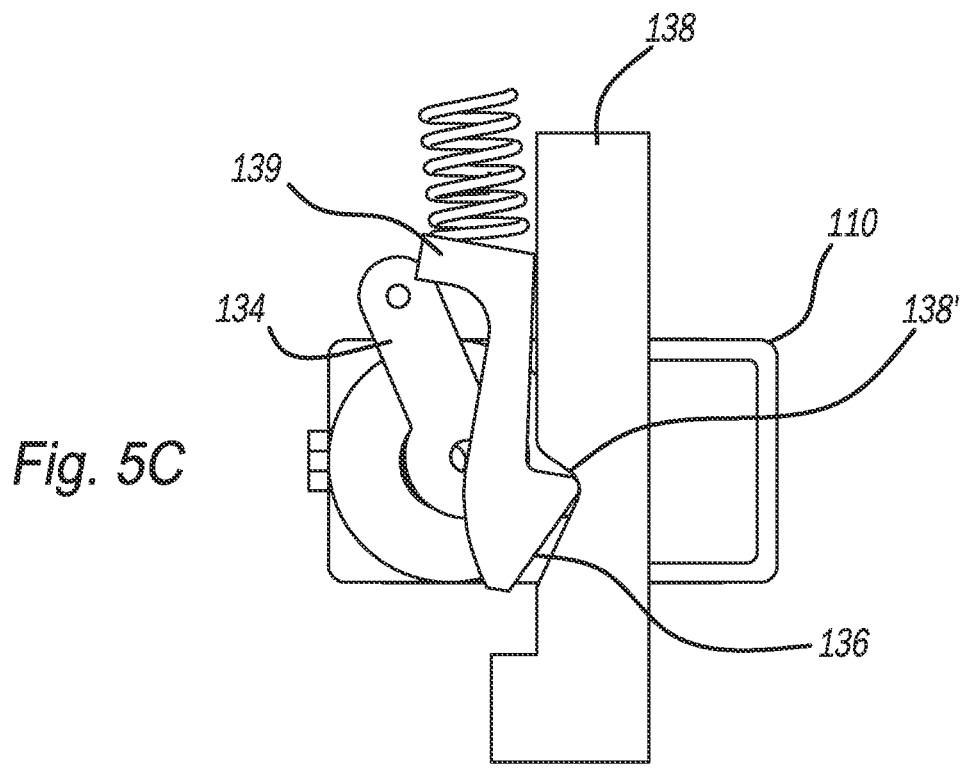
FIG. 5C is a rear elevational view illustrating the casting device at rest where certain components of the casting device are not engaged.

As shown in FIG. 5C, the center pin 138 includes a notch 138' which receives an L-shaped pin 139. A top of the L-shaped pin 139 may be biased against the center pin 138 such that a body of the L-shaped pin 139 is slightly off center and a gap is created between a bottom surface of the L-shaped pin 136 and the notch 138'. The L-shaped pin 139 may be biased in this configuration by the arm 134. In this configuration, the casting device 100 may be used in a manual and/or assisted mode where a user is able to fully operate the reel cast button 131 without assistance from the casting device 100. In the first position, the center pin 138 may move freely in an upward and a downward direction as the reel cast button 131 is depressed and released.

FIGS. 6A-6C show the actuator 110 and the arm 134 in the second position, in which the reel cast button 131 has been depressed to move the center pin 138 in a downward direction toward to the reel casing 102 to lock the casting device 100 and prevent line from being dispensed from the casting device 100. As particularly shown in FIG. 6C, the arm 134 has been rotated in a counter-clockwise rotation, such that a bottom surface of the L-shaped pin 136 is in continuous contact with a surface 137 of the center pin 138. As shown in FIG. 6B, a back of the L-shaped pin 139 is in continuous contact with a surface 135 and a top of the L-shaped pin 139 is received by a ledge 150. In this position, the center pin 138 is substantially locked in place nested against the L-shaped pin 139 with the reel cast button 131 in the depressed position. In particular, a friction fit is created between the center pin 138 and the L-shaped pin 139 to hold the casting device 100 in the second position. To unlock the casting device 100, the arm 134 may be turned by the actuator 110 in a clockwise direction to push the L-shaped pin 139 out of place and allow the center pin 138, the L-shaped pin 139, and the reel cast button 131 to return to the first position, in which they may freely move. The actuator 110 may be in communication with the microcontroller 106 and the IMU 108 to move the arm 134 between the first position and the second position, and selectively release line from the casting device 100.

Figure 7:
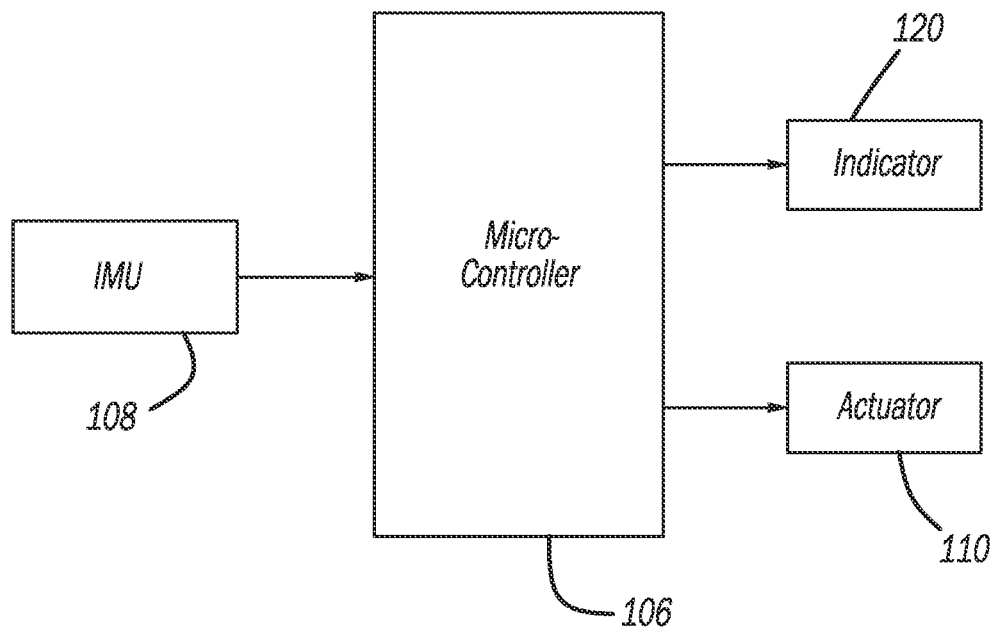
FIG. 7 is a schematic view illustrating signaling aspects between certain components of the casting device.

FIG. 7 shows a schematic view of signaling and communication aspects of the casting device 100. The casting device 100 includes a microcontroller 106 in communication with the IMU 108 and one or both of an indicator 120 and an actuator 110. The IMU 108 is configured to monitor the position of the casting device 100 relative to at least one axis of motion during use of the casting device 100. The IMU 108 is configured to send a signal to the microcontroller 106 based on a position of the casting device 100 relative to the axis of motion.

For example, the microcontroller 106 may be configured to send a signal to the indicator 120 to generate a first alert when the casting device 100 moves to a first predetermined position relative to the axis of motion as determined by the IMU 108. The indicator 120 may also generate a second alert when the casting device 100 moves to a second position, different than the first position, as determined by the IMU 108. For example, the indicator 120 may be configured to generate the first alert when the casting device 100 moves to a predetermined back cast position and generate the second alert when the casting device 100 moves to a predetermined forward cast position. In this manner, the first alert may indicate to a user that an ideal back cast position has been reached and the user should begin a forward cast. Similarly, the second alert may indicate to a user that an ideal forward cast position has been reached and the user should take an action, such as releasing a reel cast button 131 or otherwise allowing line to be released from the casting device 100. In certain embodiments, the first position and the second position may be pre-programmed. Alternatively, the first position and the second position may be selectable by a user.

The indicator 120 may be configured to generate one of an auditory alert, a visual alert, a haptic alert and a combination thereof. In certain embodiments, the IMU 108 may be further configured to measure an acceleration of the casting device 100. For example, the IMU 108 may be configured to send a signal to the microcontroller 106 that the casting device 100 is accelerating at a rate above and/or below a predetermined threshold. In response, the microcontroller 106 may be configured to send a signal to the indicator 120 which generates an alert based on the acceleration of the casting device 100.

In certain embodiments, the indicator 120 is configured to generate the first alert to indicate to a user that an ideal back cast position has been reached and the user should begin a forward cast. The actuator 110 may be configured to move the arm 134 to the first position when the casting device 100 has moved to the predetermined forward cast position to release line from the casting device 100. In certain embodiments, the casting device 100 includes a reel cast button 131 for manually releasing line from the casting device 100.

In operation, the casting device 100 may include three different modes: (1) manual, where the casting device 100 is operated substantially similar to a traditional fishing rod and reel without feedback to a user, (2) guided, where a user may receive one or more audio, visual, and/or vibrational alerts during use of the casting device 100, and (3) automatic, where a timing of a release of line from the casting device 100 is controlled by the IMU 108, the microcontroller 106, and the actuator 110.

In certain embodiments, such as shown in FIGS. 8A-8F, a casting arc may include a first action A (FIGS. 8A-8B) including address and initiation motions, a second action B (FIGS. 8C-8E) including back cast motions, and a third action C (FIG. 8F) including a forward cast motion and a release of line from the casting device 100.

Figure 8A:
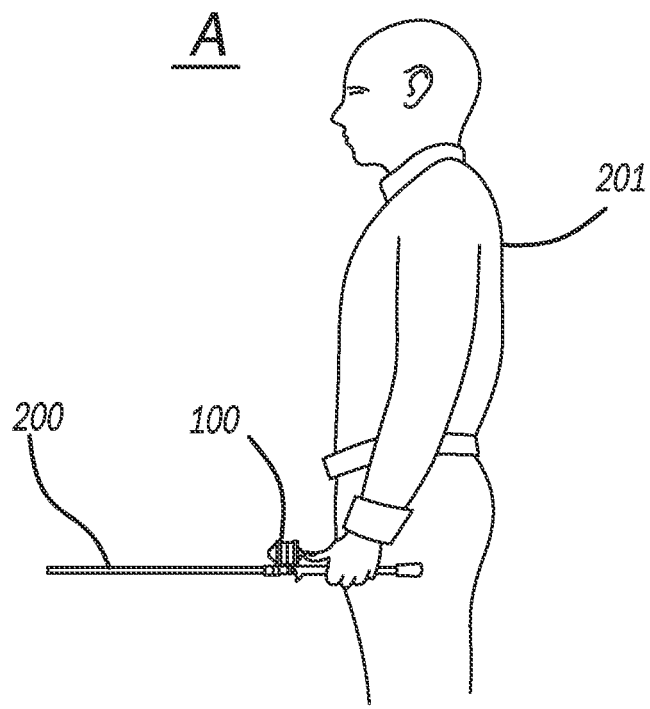
FIGS. 8A-8F depict a series of motions by a user employing a fishing rod outfitted with the fishing reel having the casting device.
Figure 8B:
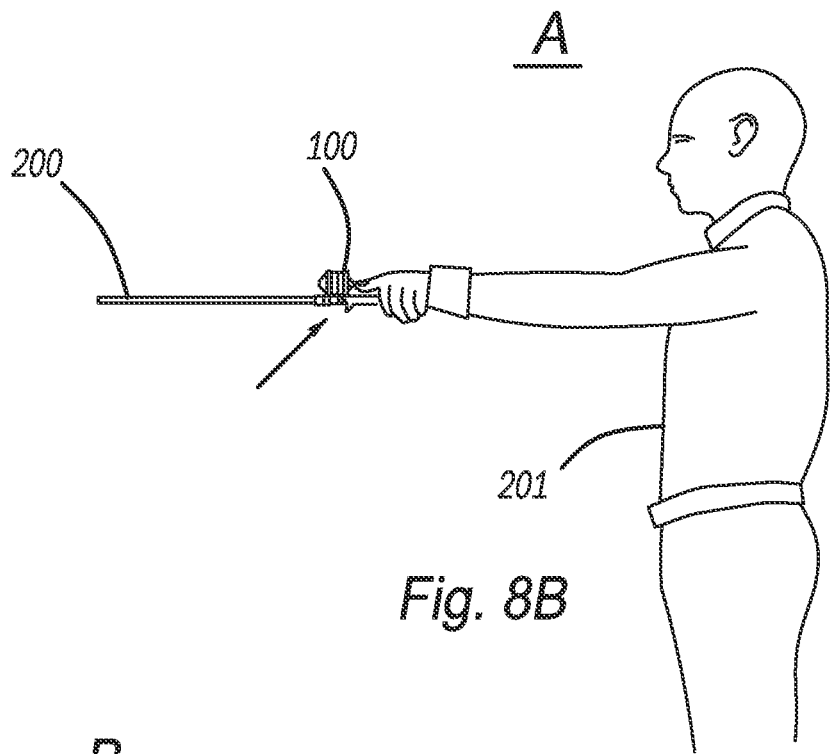
Figure 8C:
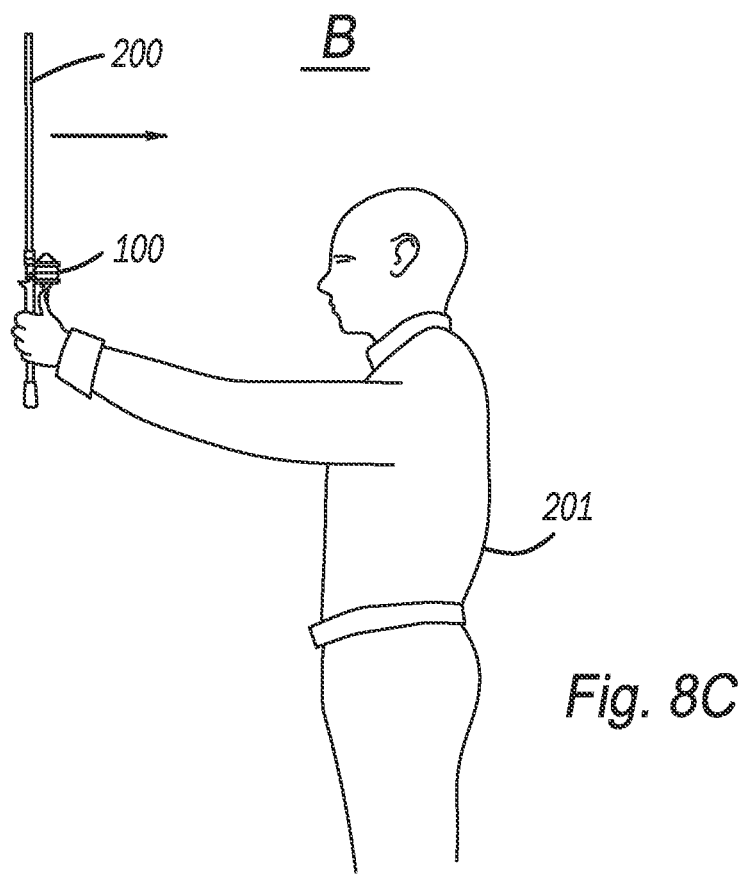
Figure 8D:
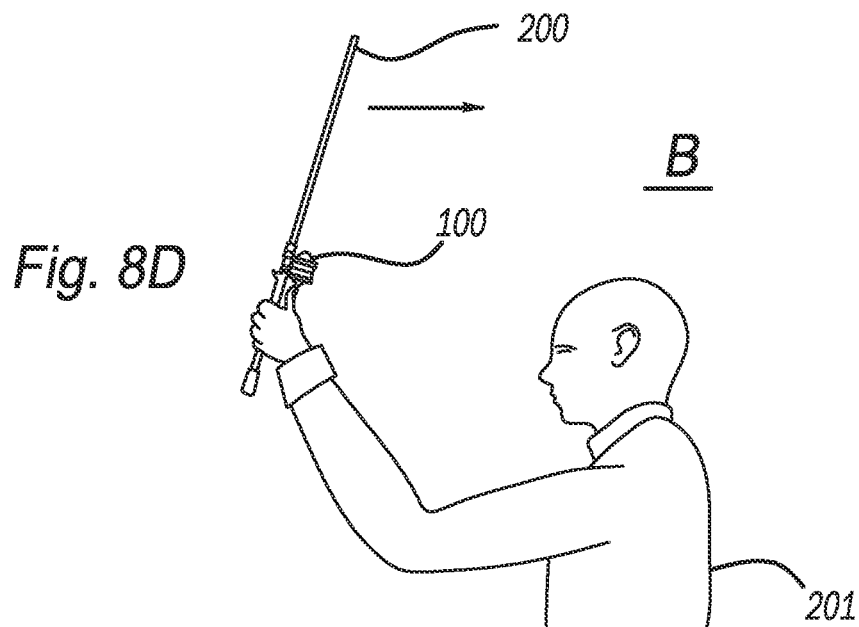
Figure 8E:
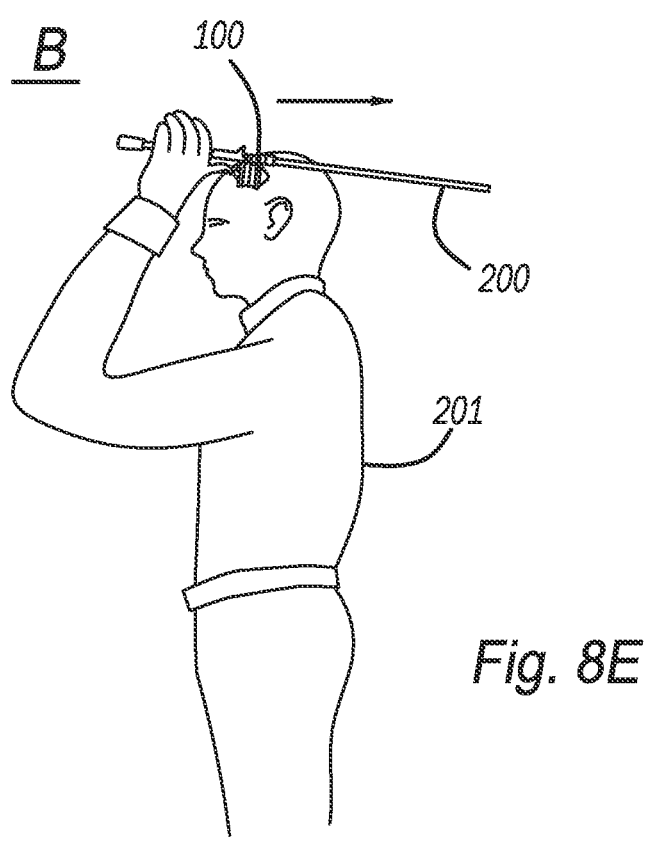
Figure 8F:
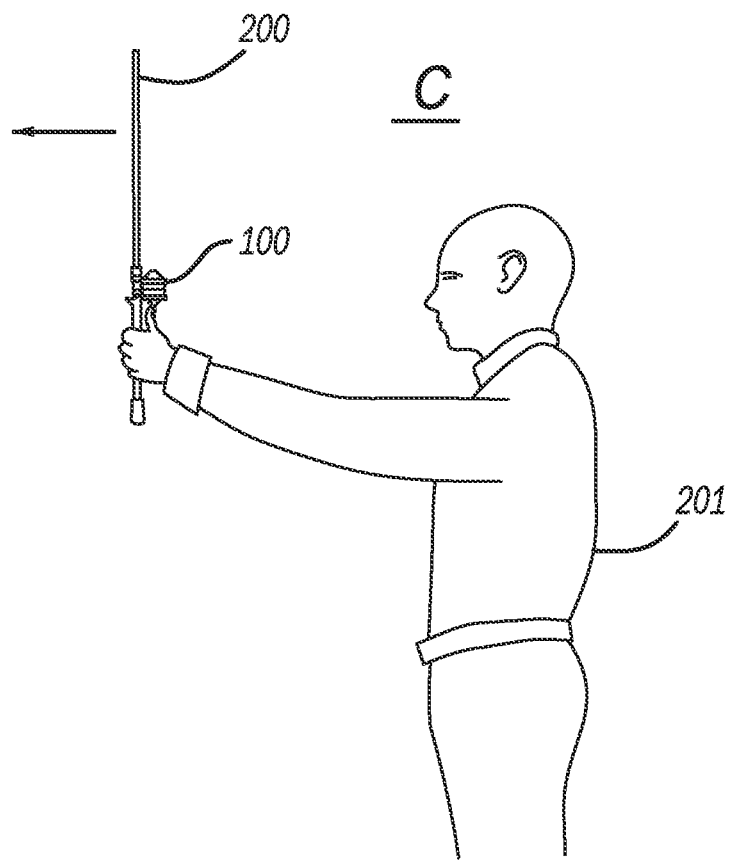

In the manual mode, the casting device 100 may allow the fishing reel to function without affirmative action from the casting device 100. In this mode, the fishing reel is not influenced by the casting device 100 and the fishing reel may operate as if it did not include the casting device 100. In the manual mode, Action A, as shown as FIGS. 8A and 8B, may consist of holding or griping the rod 200 as recommended by the manufacturer. The user 201 of the casting device 100, may engage the reel cast button 131 on the reel. In this position, the rod 200 is cantilevered out and pointing away from the front of the user 201. In the manual mode, a user may continue to hold the reel cast button 131 during Action B, the back cast, as shown 8C-8E, before initiating Action C, the forward cast, as shown in FIG. 8F. At some point during the forward cast, the user 201 will release the reel cast button 131, thus allowing the casting device 100 to release line using the centrifugal and inertial force of the action of the rod 200.

In the guided mode, during Action A, the rod 200 including the casting device 100 may be held such that the top of the rod 200 is vertical, and an axial vector of the rod 200 is substantially horizontal while the casting device 100 is being initiated and a boot up may be completed, as may be indicated by the indicator 120. In certain embodiments, the reel cast button 131 may be depressed to initiate boot up of the casting device 100. Alternatively, or in conjunction, the 11\4U 108 senses a movement of the rod 200 to vertical and the IMU 108 is configured to send a signal to the microcontroller 106 to initiate a boot up of the casting device 100.

In the guided mode, the microcontroller 106 is activated. The microcontroller 106 may be activated when the user presses and holds the reel cast button 131 as with a normal cast. In the guided mode, Action B, as shown as FIGS. 8C-8E, may consist of maneuvering the axial vector of the rod 200 to above vertical from Action A. This action may be caused mostly by bending the elbow, as well as the wrist. Axial twist in the rod 200 is unaffected, as the IMU 108 of the casting device 100 may be configured to detect only the difference in movement throughout Action A and Action B.

In this mode, the indicator 120 of the casting device 100 may help the user achieve proper form during Action B and Action C, as described above. The indicator 120 may provide a user 201 with casting technique feedback to improve the user's 201 skill without interference with the casting device 100. More specifically, the casting device 100 may begin functioning and the IMU 108 may determine and monitor the initial locations and accelerations of the rod 200. This may be done when the user has the device in the position shown in FIGS. 8A and 8B. The indicator 120 may provide the user 201 with an indication that this process is complete.

The IMU 108 may communicate the positional information of the rod 200 to the microcontroller 106. When the rod 200 and the casting device 100 reaches a predetermined position, the microcontroller 106 may be configured send a signal to the indicator 120, which generates an alert that the next position has been attained. For example, this may occur when the user 201 raises the rod 200 to a ready cast position, as shown in FIGS. 8A and 8B. This movement may enable the user 201 to begin the actual casting action.

The IMU 108 may communicate to the microcontroller 106 that the rod 200 and casting device 100 have changed position. This may occur when the user pulls the rod 200 backward, reversing direction of the device, as shown in FIG. 8C-8E. This may occur with rapid acceleration which may be detected by the IMU 108. The IMU 108 may also detect and communicate to the microcontroller 106 when the rod 200 attains a location for the user 201 to release the reel cast button 131. When the microcontroller 106 receives this information from the IMU 108, the microcontroller 106 is configured to send a signal to the indicator 120 to provide feedback to the user 201.

In the automatic mode, the microcontroller 106 is configured be activated, such that when the user presses the reel cast button 131 and or initiates the casting arc, the microcontroller 106 is in operable communication with the actuator 110. The actuator 110 may then move the arm 134 to the second position to lock the casting device 100 and may control the actions of the casting device 100. For example, the actuator 110 may rotate the arm 134 to separately lock and unlock the casting device 100 as appropriate. In practical terms, the user 201 may now only control the motion of the rod 200 as described in Action C and shown in FIG. 8F. The timing of the release in Action C of the line may be controlled by the casting device 100. For example, the actuator 110 may rotate the arm 134 to unlock the casting device 100 to release line from the casting device 100 at a predetermined forward cast position as determined by the IMU 108.

Figure 9:
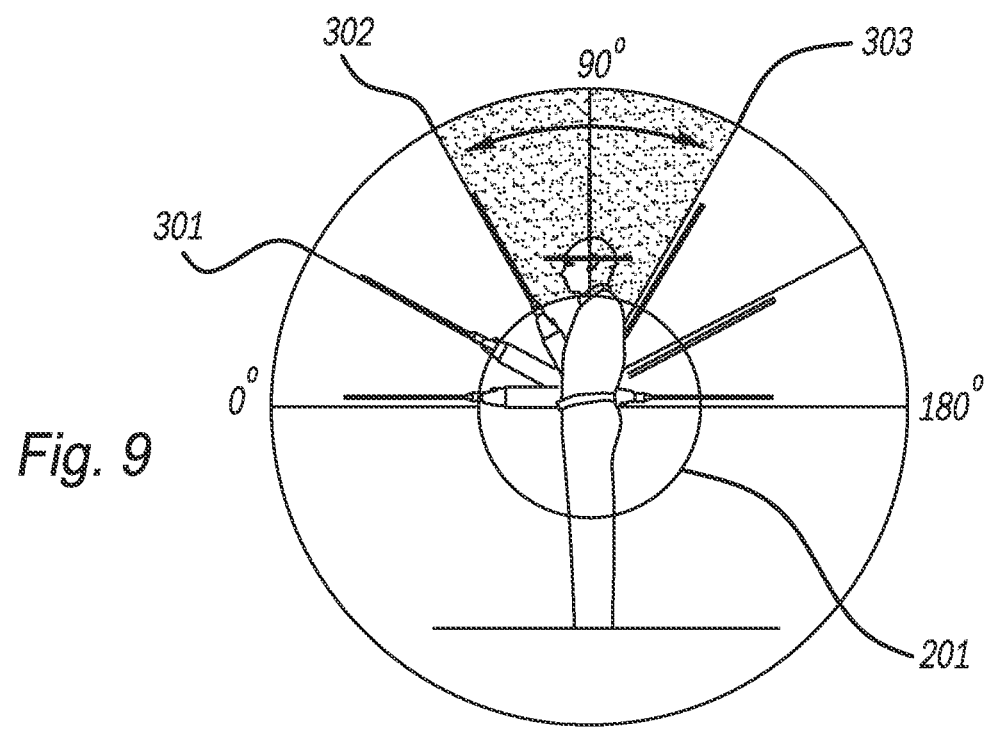
FIG. 9 depicts the user moving the fishing rod outfitted with the fishing reel having the casting device through a casting arc.

FIG. 9 shows the casting device 100 as it travels along an exemplary casting arc. As described herein above, the casting device 100 includes a microcontroller 106 in communication with the IMU 108 and one or both of an indicator 120 and an actuator 110. The IMU 108 is configured to monitor the position of the casting device 100 relative to at least one axis of motion during use of the casting device 100, for example as the casting device travels along the casting arc. The IMU 108 may be configured to send a signal to the microcontroller 106 based on a position of the casting device 100 within the casting arc.

For example, in the manual mode, a user 201 may move the rod 200 from an initial position of 0° along the casting arc to a position such as 301, at which a cast may begin. The user 201 may engage the reel cast button 131 and continue moving the rod 200 along the casting arc to a predetermined back cast position 303, at which the user 201 stops the back cast and begins the forward cast to a predetermined forward cast position 302, at which the user 201 may release the reel cast button 131, thus allowing line to release from the casting device 100.

In the guided mode, during the casting arc, the rod 200 including the casting device 100 may be held such that the rod 200 is at 0°, and an axial vector of the rod 200 is substantially horizontal while the casting device 100 is being initiated and a boot up may be completed, as may be indicated by the indicator 120. In certain embodiments, the reel cast button 131 may be depressed to initiate boot up of the casting device 100. Alternatively, or ire conjunction, the IMU 108 senses a movement of the rod 200 to vertical and the IMU 108 is configured to send a signal to the microcontroller 106 to initiate a boot up of the casting device 100.

The user 201 may continue moving the rod 200 from the initial position of 0° along the casting arc to a position such as 301, at which a cast may begin. In the guided mode, the microcontroller 106 and the IMU are activated. The casting device 100 may begin functioning and the IMU 108 may determine and monitor the initial locations and accelerations of the rod 200. The IMU 108 may communicate the positional information of the rod 200 to the microcontroller 106. When the rod 200 and the casting device 100 reaches a predetermined position along the casting arc, such as a predetermined back cast position 303, the microcontroller 106 may send a signal to the indicator 120, which generates an alert that a predetermined back cast position has been reached. In certain embodiments, the predetermined back cast position 303 may comprise a position 120° along the casting arc. However, the predetermined back cast position 303 may comprise any appropriately desired position along the casting arc. For example, the predetermined back cast position may comprise a position 90° along the casting arc. Upon receiving the alert from the indicator 120, the user 201 may stop the back cast and begin the forward cast.

At a predetermined position along the casting arc, such as a predetermined forward cast position 302, the microcontroller 106 may send a signal to the indicator 120, which generates an alert that a predetermined forward cast position 302 has been reached. In certain embodiments, the predetermined forward cast position 302 may comprise a position 60° along the casting arc. However, the predetermined forward cast position 302 may comprises any appropriately desired position along the casting arc. For example, in certain embodiments, the predetermined forward cast position 302 may comprise a position 80° to 85° along the casting arc. Upon receiving the alert from the indicator 120, the user 201 may release the reel cast button 131, thus allowing line to release from the casting device 100.

In the automatic mode, the microcontroller 106 is configured be activated, such that when the user presses the reel cast button 131 and or initiates the casting arc such as by moving the rod 200 from the initial position of 0° along the casting arc to a position such as 301, at which a cast may begin. In the automatic mode, the microcontroller 106 is in operable communication with the actuator 110. The actuator 110, such as a servomotor may move to engage the casting device 100 to control the action of the casting device 100. For example, the actuator 110 may move the arm 134 to separately lock and unlock the casting device 100 as appropriate. As the user 201 moves the rod 200 along the back cast, the actuator 110 may have engaged the casting device 100, such to lock the casting device 100 as it moves along the back cast. In certain embodiments, when the rod 200 and the casting device 100 reaches a predetermined position along the casting arc, such as a predetermined back cast position 303, the microcontroller 106 may send a signal to the indicator 120, which generates an alert that a predetermined back cast position has been reached. Upon receiving the alert from the indicator 120, the user 201 may stop the back cast and begin the forward cast. At a predetermined position along the casting arc, such as a predetermined forward cast position 302, the microcontroller 106 may send a signal to the actuator 110, which operates the arm 134 to unlock the casting device 100, thus allowing line to release from the casting device 100.

Figure 10:
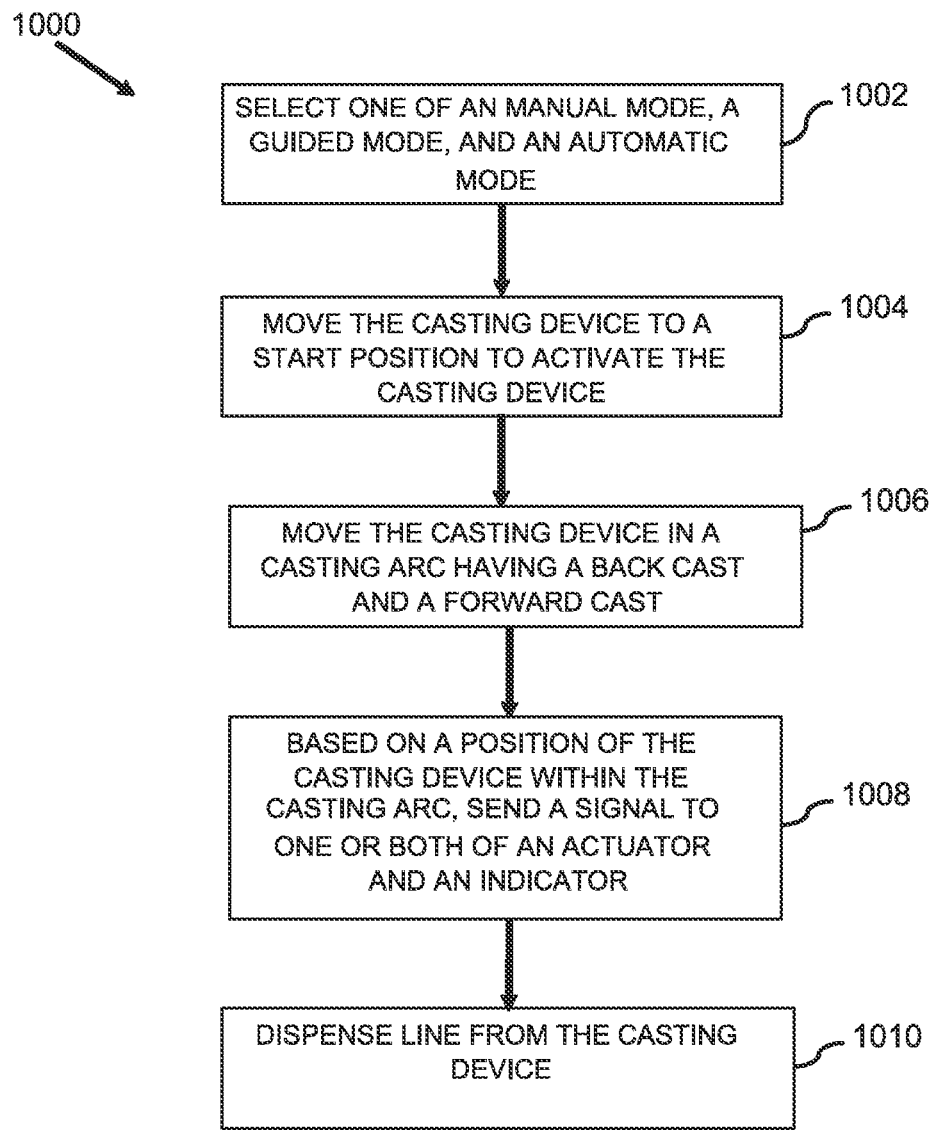
FIG. 10 is a flow chart of a first method of using the fishing rod outfitted with the fishing reel having the casting device, in accordance with the present technology.

FIG. 10 shows a flow chart of a method 1000 of using a casting device 100. In step 1002, one of a manual mode, a guided mode, and an automatic mode is selected. Then, in step 1004, the casting device 100 is moved to a start position to activate the casting device 100. In step 1006, the casting device 100 is moved in a casting arc between a back cast position and a forward cast position. In step 1008, based on a position of the casting device within the casting arc, a signal may be sent to one or both of an actuator and an indicator. Then, in step 1010, line may be released from the casting device. In certain embodiments, the casting arc is initiated by depressing a reel cast button 131 of the casting device 100.

An IMU 108 may monitor a position of the casting device 100 throughout the casting arc and an indicator 120 may generate one or more alerts based on a position of the casting device 100 within the casting arc as determined by the IMU 108. For example, in certain embodiments, a first alert may be generated at a predetermined back cast position of the casting arc and a second alert may be generated at a predetermined forward cast position of the casting arc. In certain embodiments, the method may comprise moving an arm 134 to a first position to unlock the casting device 100 to release and/or dispense the line from the casting device 100.

Figure 11:
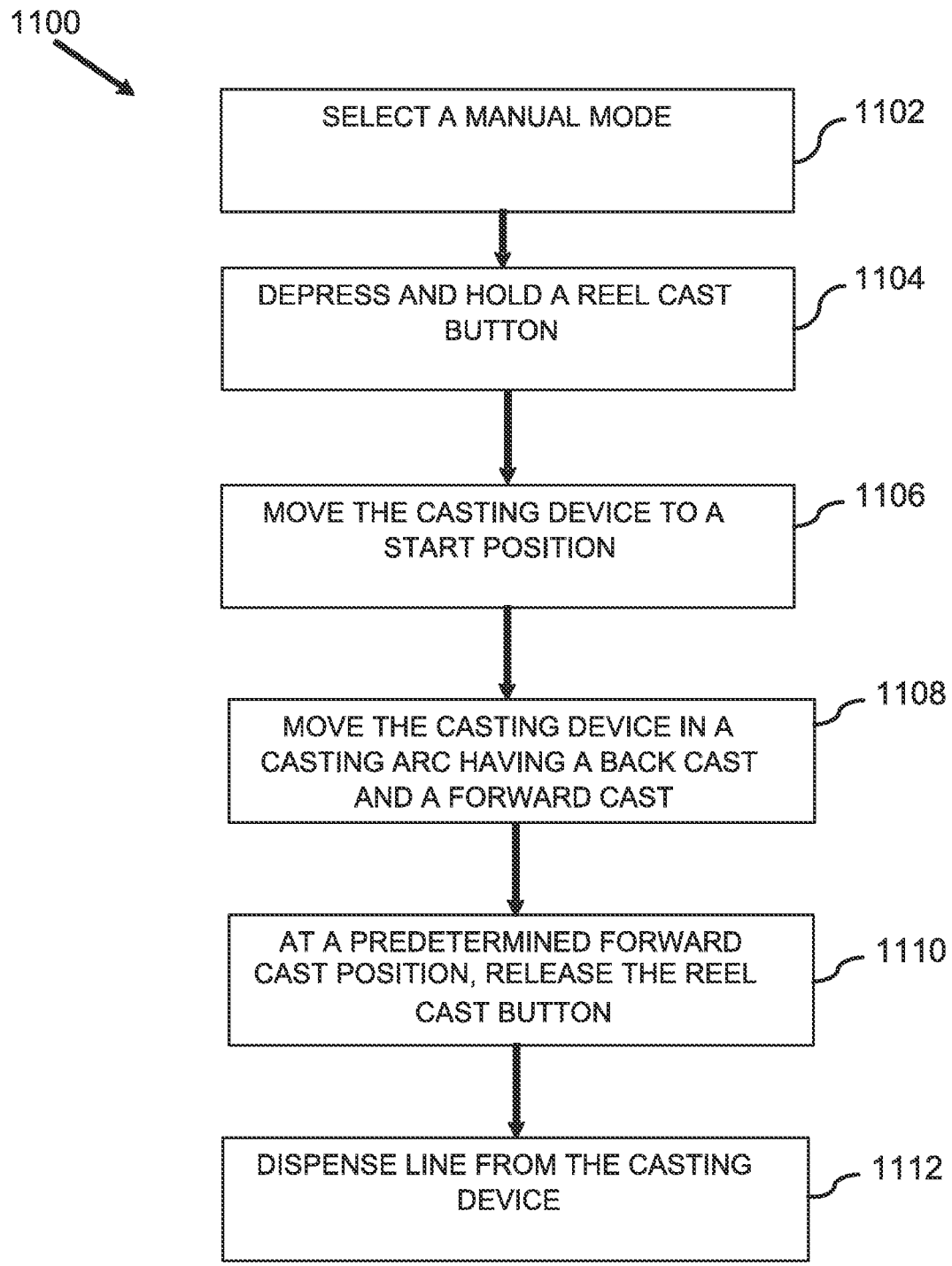
FIG. 11 is a flow chart of a second method of using the fishing rod outfitted with the fishing reel having the casting device.

FIG. 11 shows a flow chart of a method 1100 of using a casting device 100 in accordance with certain embodiments. In step 1102 a manual mode is selected at the casting device 100. In step 1104 a reel cast button 131 is depressed and held. As the reel cast button 131 is depressed and held, the casting device 100 may be move to a start position in step 1106. Then, in step 1108, the casting device 100 may be moved within a casting arc having a back cast and a forward cast. At a predetermined forward cast position, the reel cast button 131 may be released in step 1110 and line may be dispensed from the casting device 100 in step 1112.

Figure 12:
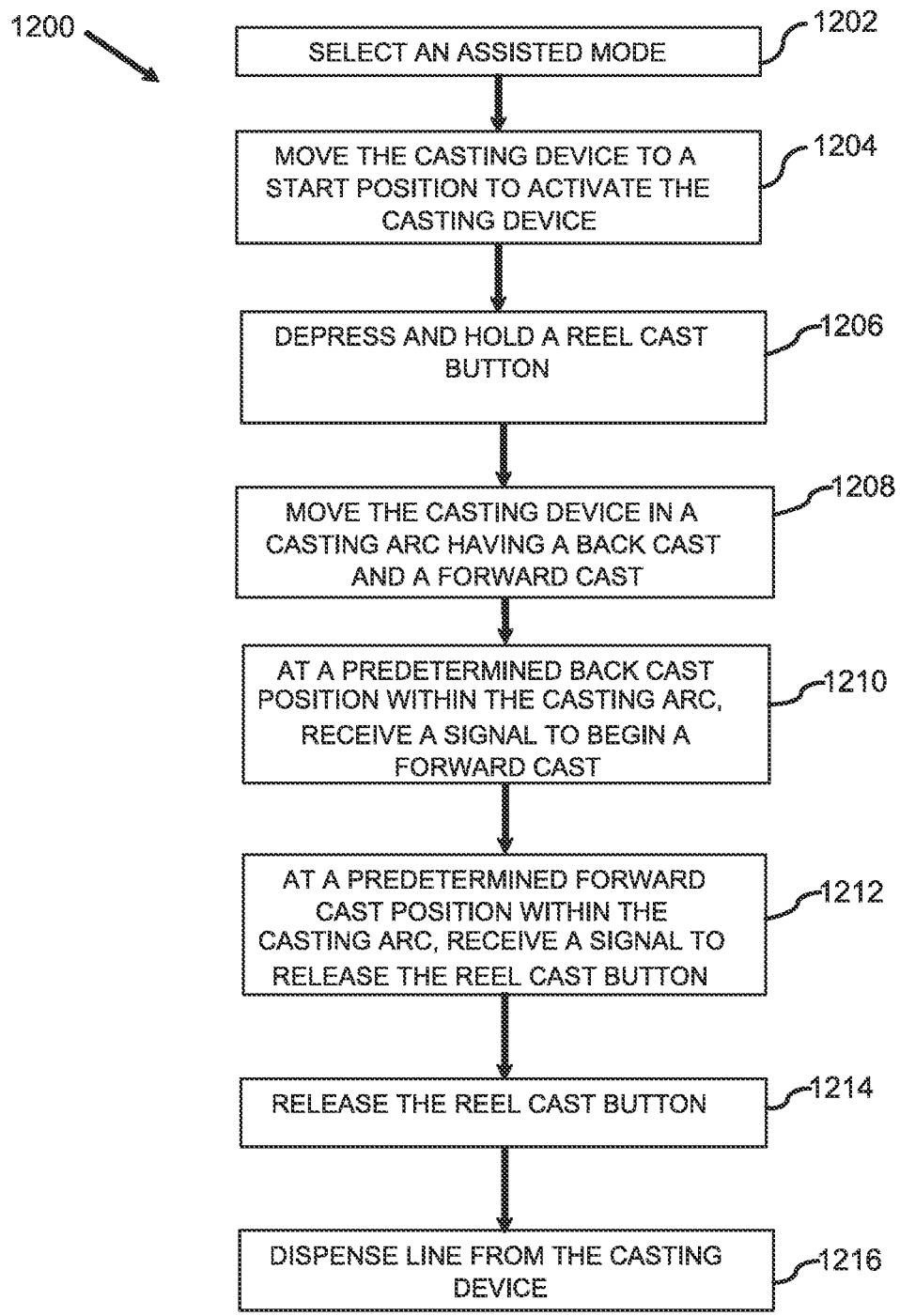
FIG. 12 is a flow chart of a third method of using the fishing rod outfitted with the fishing reel having the casting device.

FIG. 12 shows a flow chart of a method 1200 of using a casting device 100 in accordance with further embodiments. In step 1202, an assisted mode is selected at the casting device 100. In step 1204, the casting device 100 may be moved to a start position to activate the casting device 100. In step 1206 a reel cast button 131 is depressed and held. In step 1208, the casting device 100 may be moved within a casting arc having a back cast and a forward cast. In step 1210, at a predetermined back cast position within the casting arc, a signal may be received to begin a forward cast. Then, in step 1212, at a predetermined forward cast position within the casting arc a signal may be received to release the reel cast button 131. In step 1214, the reel cast button 131 may be released and in step 1216, line may be dispensed from the casting device 100.

Figure 13:
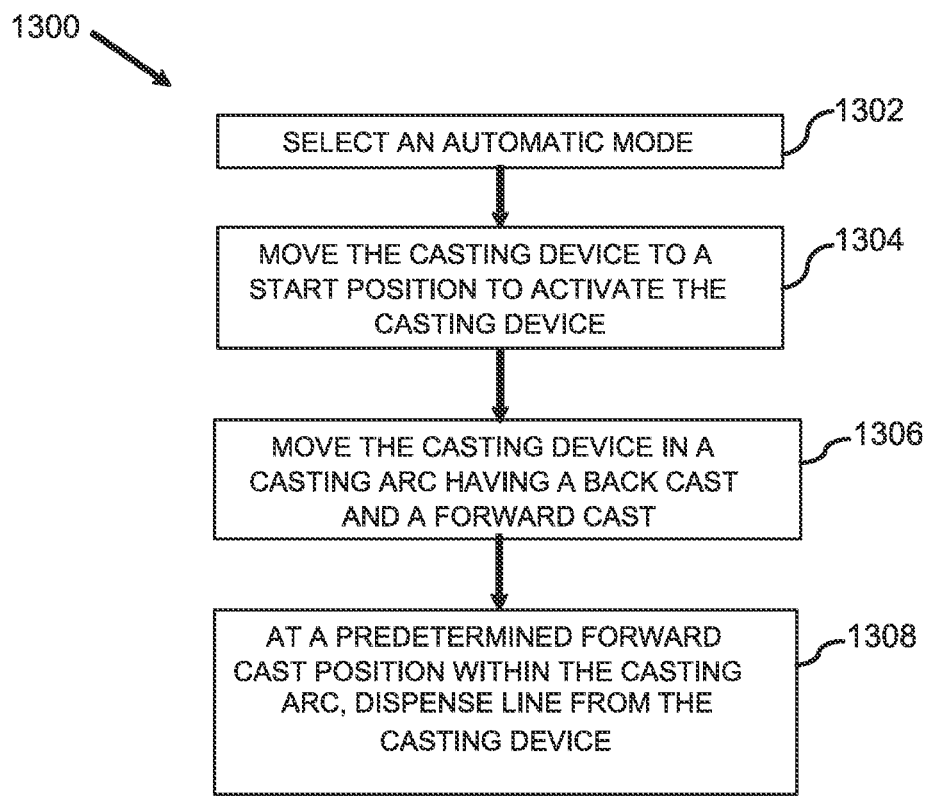
FIG. 13 is a flow chart of a fourth method of using the fishing rod outfitted with the fishing reel having the casting device.

FIG. 13 shows a flow chart of a method 1300 of using a casting device 100 in accordance with still further embodiments. In step 1302, an assisted mode is selected at the casting device 100. In step 1304, the casting device 100 may be moved to a start position to activate the casting device 100. In step 1306, the casting device 100 may be moved within a casting arc having a back cast and a forward cast. Then, in step 1308 at a predetermined forward position within the casting arc, line may be dispensed from the casting device 100.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods may be made within the scope of the present technology, with substantially similar results.

What is claimed is:

1. A casting device comprising:
a microcontroller;
an inertial measurement unit in communication with the microcontroller, the inertial measurement unit configured to monitor a position of the casting device relative to a casting arc, the inertial measurement unit configured to send a signal to the microcontroller based on the position of the casting device relative to the casting arc, the microcontroller configured to send a signal to one or both of an actuator and an indicator based on the signal from the inertial measurement unit, the indicator configured to generate a first alert when the casting device moves to a first predetermined position relative to the casting arc as determined by the inertial measurement unit, and the indicator configured to generate a second alert when the casting device moves to a second position relative to the casting arc as determined by the inertial measurement unit; and
a power source for providing power to the casting device.

2. The casting device of claim 1, wherein the power source is a battery.

3. The casting device of claim 2, wherein the battery is a solar powered battery.

4. The casting device of claim 1, wherein the first position comprises a predetermined back cast position and the second position comprises a predetermined forward cast position.

5. The casting device of claim 4, wherein the first position and the second position are adjustable.

6. The casting device of claim 1, wherein the indicator is configured to generate a member selected from a group consisting of an auditory alert, a visual alert, a haptic alert, and combinations thereof.

7. The casting device of claim 1, wherein the inertial measurement unit is further configured to measure an acceleration of the casting device.

8. The casting device of claim 7, wherein the indicator is configured to generate an alert if the casting device is accelerating one of above a predetermined threshold and below the predetermined threshold.

9. The casting device of claim 1, wherein the actuator is configured to move the casting device between a locked position and an unlocked position, where line may be released from the casting device in the unlocked position.

10. The casting device of claim 9, wherein the actuator is configured to move the casting device to the unlocked position when the casting device moves to a predetermined forward cast position.

11. A fishing reel comprising the casting device of claim 1, wherein the fishing reel includes a reel cast button for manually releasing line from the casting device.

12. A casting device comprising:
a microcontroller;
an inertial measurement unit in communication with the microcontroller, the inertial measurement unit configured to monitor a position of the casting device relative to a casting arc, the inertial measurement unit configured to send a signal to the microcontroller based on the position of the casting device relative to the casting arc, the microcontroller configured to send a signal to one or both of an actuator and an indicator based on the signal from the inertial measurement unit, the actuator configured to move the casting device between a locked position and an unlocked position, where line may be released from the casting device in the unlocked position, and the actuator includes a rotatable arm for moving the casting device between the locked position and the unlocked position; and a power source for providing power to the casting device.

13. A casting device comprising:

a microcontroller;

an inertial measurement unit in communication with the microcontroller, the inertial measurement unit configured to monitor a position of the casting device relative to a casting arc, the inertial measurement unit configured to send a signal to the microcontroller based on the position of the casting device relative to the casting arc, the microcontroller configured to send a signal to one or both of an actuator and an indicator based on the signal from the inertial measurement unit, the actuator configured to move the casting device between a locked position and an unlocked position, where line may be released from the casting device in the unlocked position, the actuator configured to move the casting device to the unlocked position when the casting device moves to a predetermined forward cast position, and the indicator is configured to generate an alert when the casting device moves to a predetermined back cast position; and a power source for providing power to the casting device.

14. A method of using a casting device comprising:

selecting one of a manual mode, a guided mode, and an automatic mode;

moving the casting device to a start position to activate the casting device;

moving the casting device in a casting arc;

based on a position of the casting device within the casting arc, sending a signal to one or both of an actuator and an indicator, the indicator configured to generate a first alert when the casting device moves to a first predetermined position relative to the casting arc as determined by the inertial measurement unit, and the indicator configured to generate a second alert when the casting device moves to a second position relative to the casting arc as determined by the inertial measurement unit; and releasing line from the casting device at a predetermined forward cast position.

15. The method of claim 14, further comprising initiating the casting arc by depressing a reel cast button of a fishing reel including the casting device.

16. The method of claim 14, wherein an alert is generated at a predetermined back cast position within the casting arc.

17. The method of claim 16, further comprising generating a first alert at the predetermined back cast position of the casting arc and generating a second alert at a predetermined forward cast position of the casting arc.

18. The method of claim 14, further comprising unlocking the casting device at the predetermined forward cast position to release the line from the casting device.

* * * * *